United States Patent Office 2,814,591
Patented Nov. 26, 1957

2,814,591
PRODUCING ELECTROLYTIC MANGANESE

Reginald S. Dean, Hyattsville, Md.

No Drawing. Application November 22, 1954,
Serial No. 470,527

3 Claims. (Cl. 204—105)

This invention relates to processes for producing electrolytic manganese, and has for its object the production of electrolytic manganese in a single compartment cell utilizing an electrolyte of manganese and ammonium chlorides and a graphite anode.

The chloride electrolyte has been found to have many advantages but oxidation at the anode has presented many problems. In my copending application Serial No. 395,807, filed December 2, 1953, I have disclosed means of overcoming much of this difficulty by suspending an oxidic manganous compound such as manganese carbonate in the electrolyte whereby to control the pH and to replenish the manganese content of the electrolyte.

The presence in the electrolyte of a reduced compound of sulphur, preferably the sulphite ion, is necessary to obtain good efficiency. With high current density and the chloride electrolyte consumption of sulphite is large.

I have found that the sulphite oxidation at the anode may be greatly reduced by adding certain reducing agents to the electrolyte in addition to sulphite. The agents of my invention are hydroxylamine and hydrazine salts and related compounds.

In my U. S. Patent No. 2,316,937, issued April 20, 1943, I disclosed hydroxylamine salts and similar compounds as antioxidants added to manganese ammonium sulphate solutions in the cathode compartment of a diaphragm cell for the production of electrolytic manganese. The present invention is concerned with anodic—not cathodic—behavior, and is specifically directed to an electrolysis involving chloride electrolytes containing sulphite. It is also specifically directed to single compartment cells having a graphite anode.

The purpose of the hydroxylamine and hydrazine salts of my invention is to depolarize the anode in such a way that the oxidation of the sulphide ion present is greatly reduced without substantial oxidation of the hydrazine, hydroxylamine and the like.

The practice of my invention permits the use of manganese carbonate, in accordance with my copending application previously referred to, which contains considerable iron as ferrous carbonate. The iron dissolved at the anode in the presence of sulphite and the other reducing agent of my invention is oxidized to an insoluble magnetic iron compound, which is present as separate particles in the suspension. The iron may be removed from the suspension by a high-intensity magnetic separator such as the Franz "Ferrofilter."

The reducing compounds of my invention include in addition to salts of hydroxylamine and hydrazine the substituted compounds of this class such as phenyl hydrazine, hydrazones, and oximes.

Having now described my invention, I will illustrate it by several examples:

Example I

I take an electrolyte composed of:

12–16 grams per liter Mn as chloride
125 grams per liter $NH_4Cl$
5–10 grams per liter suspended manganese carbonate
0.1 gram per liter $SO_2$
0.5 gram per liter hydrazine hydrochloride I adjust the pH of this solution to 6.2. I then pass this electrolyte between a titanium cathode and a graphite anode, in a single-compartment electrolytic cell, at such a rate that the pH of the electrolyte leaving the cell is 5.5 The current density on the electrodes is 100 amperes per square foot. Manganese of high purity is deposited on the cathode at a current efficiency of 69.5%. Analysis of the exit electrolyte shows a consumption of $SO_2$ of 0.1 gram per gram of manganese deposited. The loss of hydrazine is less than .001 gram per gram of manganese deposited.

The pH and manganese content of the exit electrolyte are brought to the original values by stirring with manganous carbonate.

Example II

I proceed as in Example I, except that I substitute 1.0 g./liter hydroxylamine hydrochloride for the hydrazine salt. The results obtained are substantially identical with those in Example I.

Example III

In this example I proceed as in Example I using a manganese carbonate containing 0.23% Fe as ferrous iron. I pass the electrolyte and suspended material through the cell, in the manner described, until the weight of suspended carbonate is reduced one-half. During this time the deposition of manganese has proceeded at good efficiency. I then pass the electrolyte and its suspended carbonate through a Franz "Ferrofilter" and remove a magnetic fraction analyzing 5.2% iron. The electrolyte leaving the cell during this experiment was iron-free.

I claim:

1. In a process for the electrodeposition of manganese in a single compartment cell having a graphite anode, a cathode of chemically inert metal and an electrolyte of manganese and ammonium chlorides containing sulphite ion and suspended manganese carbonate, the improvement which consists in minimizing oxidation of sulphite ion at the anode by the addition to the electrolyte of a reducing agent selected from the group consisting of salts of hydrazine, and salts of hydroxylamine, at a concentration within the range 0.1–1.0 gram per liter.

2. In a process for the electrodeposition of manganese in a single compartment electrolytic cell having a graphite anode and a cathode of chemically inert metal, in which process there is continuously circulated through the cell an aqueous electrolyte of manganese and ammonium chlorides containing sulphite ion at a concentration within the range 0.05–0.3 gram per liter and suspended manganese carbonate, the improvement which consists in minimizing oxidation of sulphite ion at the anode by including in the electrolyte a reducing agent selected from the group consisting of salts of hydroxylamine and salts of hydrazine, at a concentration within the range 0.1–1.0 gram per liter, adjusting the pH of the electrolyte before each passage through the cell to about 6, passing the electrolyte through the cell at such a rate that the pH of of the electrolyte leaving the cell is about 5.5, and before each reuse adding to the electrolyte and stirring therein additional manganese carbonate in an amount to replenish the original manganese content of the electrolyte.

3. The process of claim 2, further characterized by the manganese carbonate containing ferrous iron, the exit pH being at least 5.5, and the additional step of periodically magnetically separating the iron from the suspended material in the electrolyte.

References Cited in the file of this patent
UNITED STATES PATENTS

| | | |
|---|---|---|
| 2,119,560 | Shelton | June 7, 1938 |
| 2,317,153 | Dean | Apr. 20, 1943 |
| 2,546,547 | Koster | Mar. 27, 1951 |

OTHER REFERENCES

Jacobs et al.: U. S. Bureau of Mines Report of Investigation 4817, September 1951, pages 6 to 13.

UNITED STATES PATENT OFFICE
CERTIFICATE OF CORRECTION

Patent No. 2,814,591

November 26, 1957

Reginald S. Dean

It is hereby certified that error appears in the printed specification of the above numbered patent requiring correction and that the said Letters Patent should read as corrected below.

Column 2, line 46, after "ion" insert -- at a concentration within the range 0.05-0.3 gram per liter --.

Signed and sealed this 14th day of January 1958.

(SEAL)
Attest:

KARL H. AXLINE
Attesting Officer

ROBERT C. WATSON
Commissioner of Patents